(12) United States Patent
Babini et al.

(10) Patent No.: US 9,352,869 B2
(45) Date of Patent: May 31, 2016

(54) FOLDING UNIT FOR FORMING SEALED PACKAGES OF POURABLE FOOD PRODUCTS

(75) Inventors: Andrea Babini, Modena (IT); Alessandro Belloi, Modena (IT); Bernt Larsson, Bjärred (SE); Roland Palmquist, Åkarp (SE); Håkan G. Andersson, Åkarp (SE); Richard Nilsson, Kävlinge (SE); Thomas Aul, Eppstein (DE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 129 days.

(21) Appl. No.: 13/994,527

(22) PCT Filed: Dec. 7, 2011

(86) PCT No.: PCT/EP2011/071989
§ 371 (c)(1),
(2), (4) Date: Jun. 14, 2013

(87) PCT Pub. No.: WO2012/084510
PCT Pub. Date: Jun. 28, 2012

(65) Prior Publication Data
US 2013/0263556 A1  Oct. 10, 2013

(30) Foreign Application Priority Data

Dec. 23, 2010  (EP) ................................. 10196927

(51) Int. Cl.
*B29C 65/36* (2006.01)
*B65B 51/26* (2006.01)
(Continued)

(52) U.S. Cl.
CPC ............... *B65B 51/26* (2013.01); *B29C 65/368* (2013.01); *B29C 65/3656* (2013.01);
(Continued)

(58) Field of Classification Search
CPC ................ B29C 65/365; B29C 66/814; B29C 66/81431; B29C 66/8141; B29C 66/8122; B29C 66/812163
USPC .................. 156/272.2, 379.6, 379.8; 53/370.7
See application file for complete search history.

(56) References Cited

U.S. PATENT DOCUMENTS 3,632,943 A * 1/1972 Engler et al. ................... 219/633
4,749,833 A * 6/1988 Novorsky et al. ............. 219/603
(Continued)

FOREIGN PATENT DOCUMENTS

CN  101687365 A  3/2010
EP  1 548 081 A2  6/2005
(Continued)

OTHER PUBLICATIONS

International Search Report (PCT/ISA/210) issued on Dec. 23, 2010, by the European Patent Office as the International Searching Authority for International Application No. PCT/EP2011/071989.
(Continued)

*Primary Examiner* — Daniel McNally
(74) *Attorney, Agent, or Firm* — Buchanan Ingersoll & Rooney PC

(57) ABSTRACT

An induction sealing device for heat sealing packaging material for producing sealed packages of pourable food products, comprising: at least one first inductor which comprises, in turn, a first active surface adapted to be arranged on the side of packaging material and to heat-seal it; and a member made of plastic material; first active surface is covered by the member made of plastic material adapted to cooperate with the packaging material during its heat-sealing.

11 Claims, 3 Drawing Sheets

(51) Int. Cl.
  *B29C 65/00* (2006.01)
  *B65B 51/22* (2006.01)
  *B65B 51/30* (2006.01)
  *B29C 65/74* (2006.01)
  *B29L 31/00* (2006.01)
  *B65B 9/20* (2012.01)
  *B29K 705/02* (2006.01)

(52) U.S. Cl.
  CPC ........ *B29C 65/3668* (2013.01); *B29C 66/0062* (2013.01); *B29C 66/1122* (2013.01); *B29C 66/4312* (2013.01); *B29C 66/72321* (2013.01); *B29C 66/72328* (2013.01); *B29C 66/72341* (2013.01); *B29C 66/8122* (2013.01); *B29C 66/81263* (2013.01); *B29C 66/81427* (2013.01); *B29C 66/81431* (2013.01); *B29C 66/81811* (2013.01); *B29C 66/81871* (2013.01); *B29C 66/8491* (2013.01); *B65B 51/227* (2013.01); *B65B 51/306* (2013.01); *B29C 65/7451* (2013.01); *B29C 66/71* (2013.01); *B29C 66/81422* (2013.01); *B29C 66/81457* (2013.01); *B29C 66/83543* (2013.01); *B29K 2705/02* (2013.01); *B29L 2031/7166* (2013.01); *B65B 9/20* (2013.01)

(56) References Cited

U.S. PATENT DOCUMENTS

| 5,247,779 | A | * | 9/1993 | Wirsig et al. | ................ | 53/374.2 |
| 5,483,043 | A | | 1/1996 | Sturman, Jr. et al. | | |
| 2009/0049800 | A1 | * | 2/2009 | Sadler et al. | ................. | 53/374.2 |
| 2010/0180545 | A1 | * | 7/2010 | Palmquist et al. | .............. | 53/285 |

FOREIGN PATENT DOCUMENTS

| EP | 2 008 795 A1 | 12/2008 |
| JP | 2010-531282 A | 9/2010 |
| WO | 2009/000928 A3 | 12/2008 |
| WO | WO 2009/063515 A1 | 5/2009 |

OTHER PUBLICATIONS

Written Opinion (PCT/ISA/237) issued on Dec. 23, 2010, by the European Patent Office as the International Searching Authority for International Application No. PCT/EP2011/071989.

Office Action issued on Dec. 14, 2015, by the Japanese Patent Office in corresponding Japanese Patent Application No. 2013-545164, and an English Translation of the Office Action. (9 pages).

\* cited by examiner

FOLDING UNIT FOR FORMING SEALED PACKAGES OF POURABLE FOOD PRODUCTS

TECHNICAL FIELD

The present invention relates to an induction sealing device for heat sealing packaging material for producing sealed packages of pourable food products.

BACKGROUND ART

Many pourable food products, such as fruit juice, UHT milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of layers of heat-seal plastic material, e.g. polyethylene films, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

According to a first known technique, packages of this sort are produced on fully automatic packaging units, on which a continuous tube is formed from the web-fed packaging material; the web of packaging material is sterilized on the packaging unit, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is fed continuously in a first vertical direction, is filled with the sterilized or sterile-processed food product, and is gripped at equally spaced cross sections by two pairs of jaws. More specifically, the two pairs of jaws act cyclically and successively on the tube, and heat seal the packaging material of the tube to form a continuous strip of pillow packs connected to one another by respective transverse sealing bands, i.e. extending in a second direction perpendicular to said first direction.

The pillow packs are separated by cutting the relative transverse sealing bands, and are then fed to a final folding station where they are folded mechanically into the finished parallelepiped shape.

According to a second alternative technique, the packaging material may be cut into blanks. In this case, blanks are firstly erected to form sleeves which are sealed at their bottom ends. Afterwards, the sleeves are filled with the pourable product through their open top ends, and top ends are sealed, so as to complete the formation of packages. Once formed, packages are sterilized.

In both cases, the packaging material in which the layer of barrier material comprises a sheet of electrically conductive material, e.g. aluminium, is normally heat sealed by a so-called induction heat-sealing process, in which, a loss current is induced in, and locally heats, the aluminium sheet, thus melting the heat-seal plastic material locally.

More specifically, in induction heat sealing, the sealing device substantially comprises an inductor powered by a high-frequency current generator and substantially comprising one or more inductor bars made of electrically conductive material, and which interact with the packaging material to induce a loss current in it and heat it to the necessary sealing temperature.

In case that packages are formed starting from a tube of packaging material, the sealing device is fitted to a first jaw. The other jaw, known as the counter-jaw, comprises a counter-sealing element fitted with pressure pads made of elastomeric material, and which cooperate with the sealing device to heat seal the tube along a relative transverse sealing band. In detail, the sealing device locally melts the two layers of heat-seal plastic material gripped between the jaws.

Furthermore, the counter-jaw houses in sliding manner a cutting element. In particular, the cutting element may slide towards and away from the sealing device of the sealing jaw along a third direction orthogonal to first and second direction.

In case that packages are formed starting from relative blanks of packaging material, the sealing device is fitted to a jaw of a packaging unit.

In both cases, known sealing devices substantially comprise a supporting body which defines two front seats for housing respective inductor bars; and an insert made of magnetic flux-concentrating material—in particular, a composite material comprising ferrite—and housed inside the supporting body, close to the inductor bars.

More precisely, inductor bars comprise relative active surfaces which are arranged on outer surface of sealing device, and cooperate with the packaging material during the formation of packages.

Active surfaces also comprise respective projections which are intended to cooperate with packaging material and increase the pressure thereon, so causing the mixing of the melted plastic material of the packaging material in the sealing area.

Though performing excellently on the whole, sealing device of the type described leave room for improvement.

In greater detail, a first need is felt within the industry to avoid that short circuits be produced between the active surfaces.

As a matter of fact, short circuits between the active surfaces may prevent the induced loss current from flowing within the packaging material so impairing the final quality of heat-sealing. Furthermore, short-circuits may damage the inductor bars and may result in an interruption of the heat-sealing process.

In particular, short circuits may be produced when the packaging material is provided with a plurality of pierceable portions about which a frame of an opening device will be fitted.

Each pierceable portion of the package may be defined by a so-called "prelaminated" hole, i.e. a hole formed in the base layer only and covered by the other lamination layers, including the layer of gas-barrier material.

In case it forms the layer of gas-barrier material, the aluminium layer could get in contact with the active surfaces and create an electrical bridge therebetween.

Short circuits between active surfaces may be also caused by residues of highly saline food products, for example dog food containing a saline gel, which lay between the active surfaces of the inductor bars.

Such kind of short circuit may especially occur when packages are formed from blanks. This is mainly due to the fact that the filling of sleeves with food product and the sealing of top ends of sleeves generates splashes of food product onto and between the active surfaces of the inductor bars.

Furthermore, in the case of packages formed from blanks, sealing device seals top ends of two sleeves at the same time and need, therefore, to be powered with a very high voltage, so increasing the risk of short-circuits.

A second need is felt within the industry to avoid that inductor bars and especially their projections are corroded.

As a matter of fact, the corrosion of projections and/or of part of the inductors adjacent thereto could reduce the pressure exerted by active surfaces onto packaging material and mixing of the melted plastic material of packaging material, so reducing the overall quality of the sealing.

DISCLOSURE OF INVENTION

It is an object of the present invention to provide an induction sealing device, for heat sealing packaging material for producing sealed packages of pourable food products, and designed to provide the above aim in a straightforward, low-cost manner.

According to the present invention, there is provided an induction sealing device, for heat sealing packaging material for producing sealed packages of pourable food products, as claimed in claim 1.

BRIEF DESCRIPTION OF THE DRAWINGS

A preferred, non-limiting embodiment of the present invention will be described by way of example with reference to the accompanying drawings, in which.

MODES FOR CARRYING OUT THE INVENTION

Figure 1:
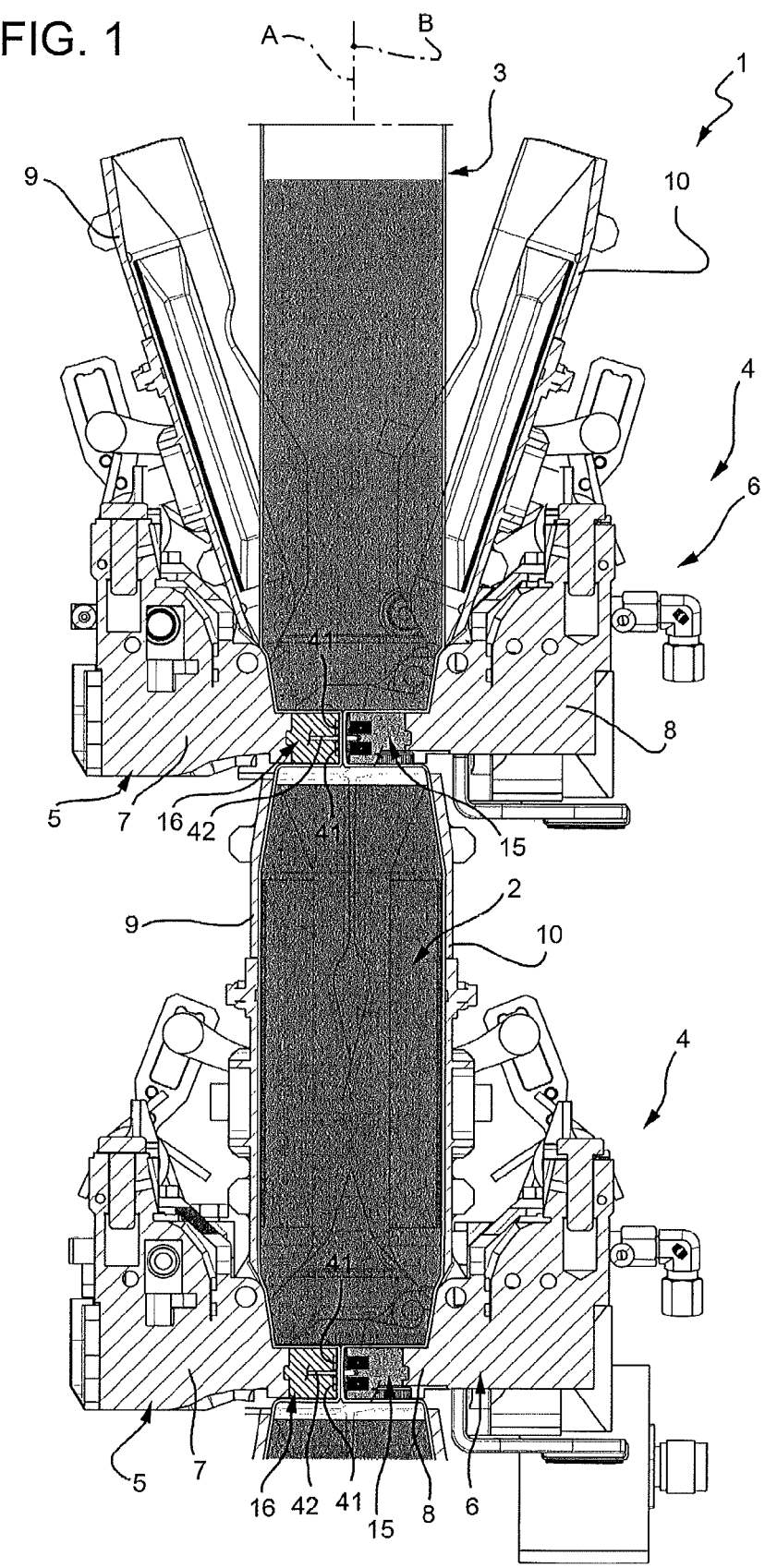
FIG. 1 shows a side view, with parts removed for clarity, of a packaging unit for producing aseptic sealed packages of pourable food product from a tube of packaging material fed along a vertical forming path.

Number 1 in FIG. 1 indicates as a whole a packaging unit for producing aseptic sealed packages 2 of a pourable food product, such as pasteurized or UHT milk, fruit juice, wine, etc., from a tube 3 of packaging material.

The packaging material has a multilayer structure (not shown), and comprises a layer of fibrous material, normally paper, covered on both sides with respective layers of heat-seal plastic material, e.g. polyethylene; and the side of the packaging material eventually contacting the food product in package 2 also has a layer of electrically conductive barrier material, e.g. aluminium, in turn covered with one or more layers of heat-seal plastic material.

Tube 3 is formed in known manner upstream from unit 1 by longitudinally folding and sealing a web of heat-seal sheet material, is filled with the sterilized or sterile-processed food product, and is fed by known devices (not shown) along a vertical path in a direction A.

Unit 1 comprises two forming assemblies 4 (only one of which is shown in FIG. 1), which move vertically along respective rails (not shown) and interact cyclically and successively with tube 3 to grip it at equally spaced cross sections and perform induction heat-seal and cutting operations on tube 3.

Each forming assembly 4 substantially comprises a slide (not shown) which runs along the respective rail; and two jaws 5, 6 (only shown as necessary for a clear understanding of the present invention) hinged to the slide about respective horizontal axes, and movable between a closed position and a fully-open position.

In the example shown, jaws 5, 6 of each forming assembly 4 have respective arms 7, 8, which interact with tube 3, extend orthogonally to a direction B perpendicular to direction A, and are located on opposite sides of tube 3.

Each forming assembly 4 also comprises two facing forming shells 9, 10 hinged to respective jaws 5, 6 and movable between an open position, into which they are pushed by elastic means (not shown), and a closed position, in which they mate to form a space defining the shape and volume of package 2 to be formed in between.

Each forming assembly 4 also comprises an induction sealing device 15 and a cutting device 16 for respectively performing, on each cross section of tube 3 of packaging material gripped between relative jaws 5, 6, an induction heat-seal operation and a cutting operation along the centerline of the cross section.

Figure 2:
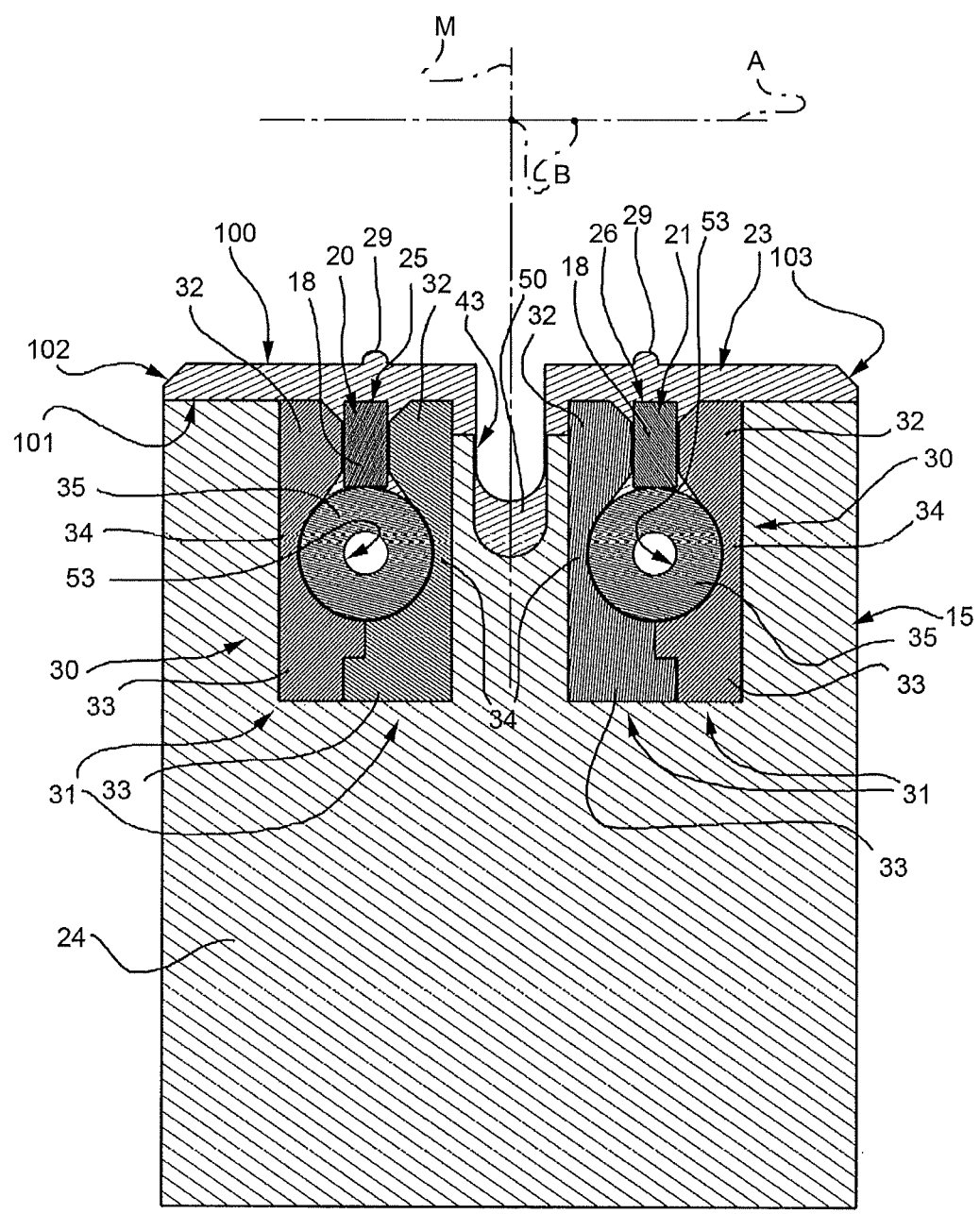
FIG. 2 shows a cross section of a first embodiment of an induction sealing device according to the present invention and which is incorporated in the packaging unit of FIG. 1.

With reference to FIG. 2, sealing device 15 comprises:
two inductors 20, 21, which interact with the packaging material by inducing a loss current in the conductive layer thereof and by means of respective active surfaces 25, 26 to perform said induction heat-seal operation on the material;
a supporting body 24 made of heat-conducting material;
a pair of inserts 30 made of magnetic flux-concentrating material and received inside supporting body 24; and
a member 23 made of plastic material.

In detail, inductors 20, 21 comprise respective first ends (not-shown) electrically connected to each other, and respective second ends, opposite to first ends, connected to a voltage generator.

In this way, inductors 20, 21 form a coil through which electrical current flows.

In the example shown, inductors 20, 21 of each sealing device 15 are preferably made of copper and comprises respective electrically conductive bars 18 extending in direction B and located in pairs on opposite sides of a mid-plane M of supporting body 24.

In a preferred embodiment, sealing device 15 also comprises respective hollow cylindrical elements 35 extending along an axis parallel to direction B and defining respective cylindrical cooling cavities 53.

Each hollow cylindrical element 35 is connected to inductors 20, 21, e.g. is welded thereto.

More specifically, plane M is perpendicular to direction A and parallel to direction B.

Inductors 20, 21 are symmetrical with respect to plane M.

Bars 18 are preferably rectangular in cross section.

Active surfaces 25, 26 (only shown in FIG. 2) of inductors 20, 21 are preferably rectangular, are elongated in direction B, and extend in the same plane perpendicular to plane M.

More specifically, supporting body 24 is made of aluminum.

Alternatively, supporting body 24 may be made of composite material, ceramic, or metal material other than aluminum.

Each insert 30 comprises a pair of elements 31 having respective top portions 32 cooperating with respective inductors 20, 21 and respective bottom portions 33 cooperating with each other. Furthermore, elements 31 have respective intermediate portions 34 which cooperate with elements 35 of sealing device 15.

Member 23 advantageously covers active surfaces 25, 26 of inductors 20, 21 and is adapted to cooperate with the packaging material of tube 3 during the heat-sealing of the packaging material.

In particular, member 23 is integral with inductors 20, 21 and is made by injecting plastic material.

In other words, member 23 is defined by a body or a layer of plastic material injection molded to inductors 20, 21, so as to be firmly connected thereto.

In detail, member 23 comprises two portions separate from each other and which extend symmetrically to plane M and is bounded by:
- a surface 100 arranged on the side of the packaging material and adapted to cooperate with the packaging material during the heat-sealing of cross sections of tube 3;
- a surface 101, opposite to surface 100, and which cooperates with active surface 25, 26 of respective inductor 20, 21 and top portions 32 of elements 31; and
- a pair of lateral portions 102, 103 opposite to each other and arranged between surfaces 100, 101.

Surface 100 of member 23 bounds, in use, sealing device 15 on the side of packaging material.

Member 23 also comprises a pair of projections 29 which project towards tube 3 of packaging material from surface 100. Projections 29 protrude from surface 100 on the opposite side of active surface 25, 26 and serve, during heat sealing, to increase the grip pressure on tube 3.

Surface 101 of member 23 also covers top portions 32 of respective elements 31 of insert 30.

As a result, elements 31 are covered, on the side arranged in use towards packaging material, by member 23.

Cutting device 16 also comprises two pressure pads 41 (FIG. 1) made of heat-resistant elastomeric material, preferably nitrile rubber, and housed in respective front cavities of the same shape formed in jaw 5 of relative forming assembly 4 and located symmetrically on opposite sides of plane M. Pressure pads 41 of each jaw 5 cooperate with member 23 of relative jaw 6 to grip and heat seal tube 3 on opposite sides of plane M.

With reference to FIG. 1, cutting device 16 comprises a substantially flat cutting member 42, which is housed in sliding manner inside a front seat on jaw 5 of relative forming assembly 4, is movable along plane M, and is activated in known manner, not shown, by a hydraulic cylinder built into jaw 5.

Cutting member 42 is normally maintained in a withdrawn rest position, housed completely inside jaw 5, by known elastic means (not shown), and is moved by the relative hydraulic cylinder into a forward cutting position, in which it projects frontwards from jaw 5, engages recess 43 in sealing device 15 of relative jaw 6 (FIG. 2), and cuts along the centerline of the relative cross section of tube 3.

Cutting member 42 comprises a platelike base portion integral with the output member of the actuating hydraulic cylinder; and a cutter smaller in thickness, in direction A, than the base portion to ensure high cutting pressure and avoid damaging the packaging material.

Sealing device 15 finally comprises a further member 50 made of plastic injected into a part of recess 43.

In the embodiment shown, member 50 is distinct from portions of member 23.

The above pealing device 15 is particularly suitable for transversally sealing cross sections of tube 3, from which sealed packages are formed.

In use, tube 3 is filled with the pourable food product, advanced along direction A and longitudinally sealed.

In the same time, each pair of jaws 5, 6 and shells 9, 10 move cyclically and successively between respective open and closed positions, so that tube 3 is gripped at equally-spaced cross sections.

In detail, the packaging material of tube 3 is gripped between surface 100 of member 23 and pressure pads 41 of jaw 5.

Inductors 20, 21 are activated and induce a loss current in the gripped packaging material and heat it to the necessary sealing temperature.

Due to the fact that member 23 covers active surface 25, 26 of inductors 20, 21, substantially no residues of food product could lay onto such active surfaces 25, 26.

In addition, due to the fact that member 23 covers active surfaces 25, 26, corrosion of active surfaces 25, 26 is substantially prevented.

As the cross-section of tube 3 is heat-sealed, projections 29 increase the grip pressure on tube 3, so that the melted plastic material of the packaging material present at the cross-section is mixed.

After that sealing of cross-section of tube 3 is completed, cutting member 42 is moved into the forward cutting position, cuts along the centerline the relative cross section of tube 3, so as to engage recess 43.

Figure 3:
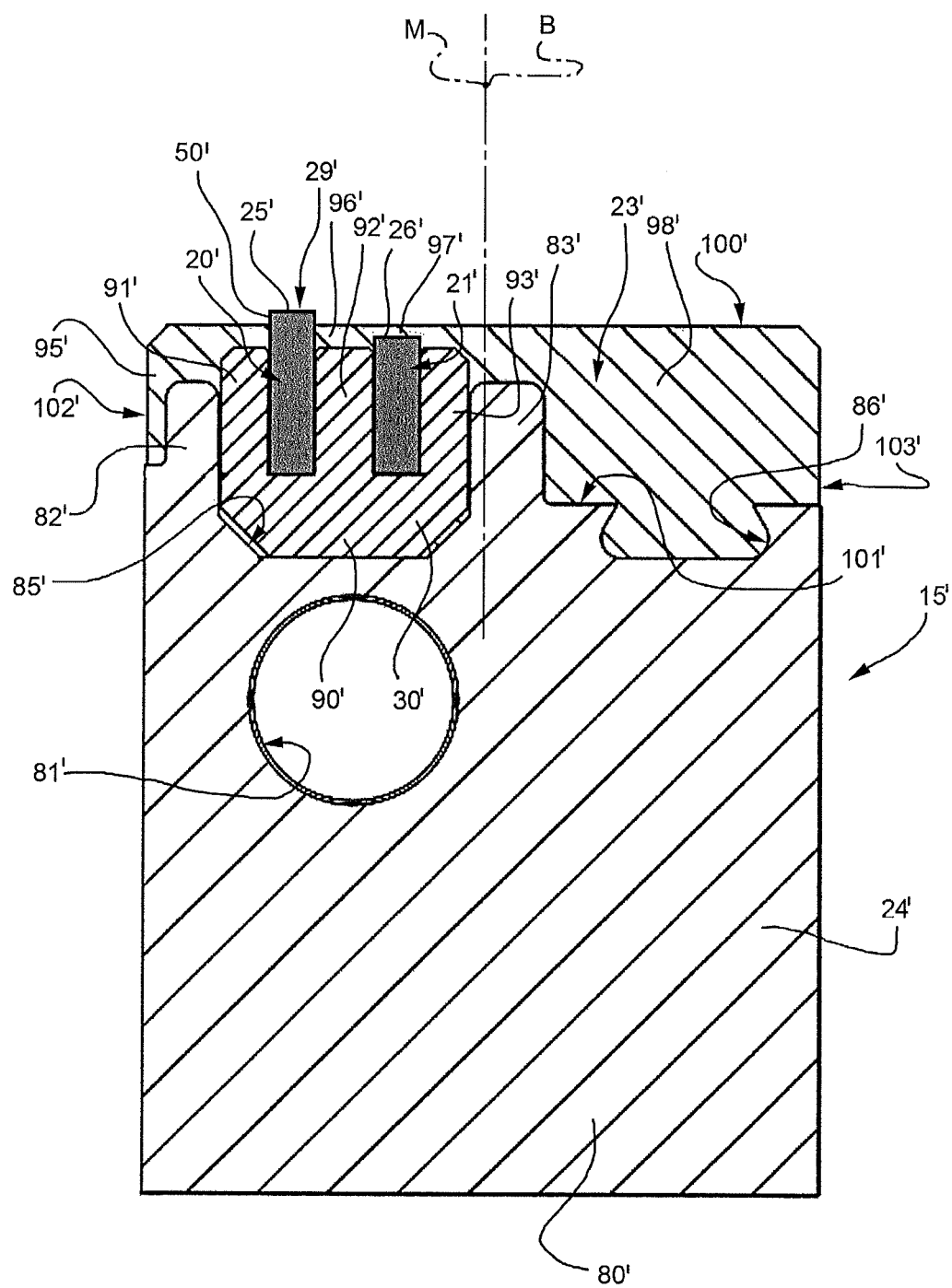
FIG. 3 shows a cross section of a second embodiment of an induction sealing device according to a second embodiment of the present invention.

Number 15' in FIG. 3 indicates a second embodiment of a sealing device in accordance with the present invention; sealed packages 15, 15' being similar to each other, the following description is limited to the differences between them, and using the same references, where possible, for identical or corresponding parts.

Member 23' advantageously covers only active surface 26'.

Furthermore, inductor 20' comprises an end portion 50' which protrudes from member 23' on the opposite side of supporting body 24'.

More in detail, end portion 50' comprises active surface 25' and defines, on the opposite side of member 23', projection 29'.

Active surface 25' is thus not covered by member 23' and cooperates with the packaging material during the heat-sealing thereof, so as to exert a pressure on tube 3 during the sealing.

In other words, member 23' is defined by a body or a layer of plastic material injection molded onto inductor 21' and firmly connected thereto; such body or layer being crossed by end portion 50' of inductor 20', so that active surface 25' may, in use, contact the packaging material to be sealed.

Supporting body 24' comprises:
- a main portion 80' adapted to be fixed in a not-shown way to a jaw, defining a cooling through hole 81' and a pair of protrusion 82', 83' protruding from main portion 80' on the opposite side of hole 81';
- a trapezoidal seat 85' laterally bounded by protrusion 82', 83' and engaged by insert 30'; and
- a dovetail seat 86' arranged on the side of protrusion 83' opposite to seat 85'.

Insert 30' is cup-shaped and comprises:
a main portion 90' elongated along direction B; and
three projections 91', 92', 93' projecting from main portion 90' parallel to plane M, on the opposite side to main portion 80', and embedded within member 23'.

Inductor 20' is interposed between projections 91', 92' and inductor 21' is interposed between projections 92', 93'.

Member 23' is bounded by:
- a flat surface 100' on the opposite side of insert 30';
- a stepped surface 101' on the side of supporting body 24'; and
- a pair of surfaces 102', 103' which extends between surfaces 100', 101'.

In detail, inductor 20' passes through surface 100', so that active surface 25' is on the opposite side of surface 100' relative to surface 101'. Active surface 26' is covered by surface 101'.

In detail, proceeding from surface 102' towards surface 103', member 23' comprises:
- a portion 95' covering protrusion 82' and projection 91' and extending between surface 102' and inductor 20';
- a portion 96' covering projection 92' and extending between inductors 20', 21';
- a portion 97' covering inductor 21'; and
- a portion 98' covering projection 93', protrusion 83', filling seat 86' and extending between inductor 21' and surface 103'.

Therefore, insert 30' is covered by member 23'.

Sealing device 15' is preferably used for sealing packages that are formed starting from corresponding blanks of packaging material.

In use, blanks provided with a pre-made longitudinal sealing are erected so as to form corresponding sleeves which are open at respective top and bottom ends.

Bottom ends of sleeves are therefore sealed through a not-shown sealing device. Afterwards, sleeves are filled with the pourable food product and their top ends are sealed by sealing device 15'.

In detail, inductors 20', 21' are activated and induce a loss current in the packaging material and heat it to the necessary sealing temperature.

The residues of the food product squirted out from sleeves during the sealing of their top end may lay onto active surface 25' but are substantially prevented from laying onto active surface 26', because the latter is covered by member 23'.

As top ends of sleeves are heat-sealed, end portions 50' of inductor 20' increases the grip pressure on the packaging material packaging material forming the top ends of sleeves, so facilitating the mixing the plastic material of packaging material.

The advantages of sealing device 15, 15' according to the present invention will be clear from the foregoing description.

In particular, due to the fact that plastic member 23; 23' covers active surface 25, 26; 25', the exposed aluminum layer of the packaging material, if any, is prevented from contacting and creating an electrical connection between active surfaces 25, 26; 25', 26'.

Furthermore, the residues of food product are substantially prevented from creating short circuits between active surfaces 25, 26; 25', 26' and therefore between inductors 20, 21; 20', 21'.

As a result, there is substantially no risk that the loss current induced by inductors 20, 21; 20', 21' fails to flow through the packaging material and that, therefore, the final quality of the sealing is impaired and/or the operation of the packaging unit is interrupted.

This is particularly advantageous when sealing device 15' is used for sealing packages formed from blanks and filled with a dog food product containing saline gel. As a matter of fact, the residues of dog food product squirted out from sleeves during the formation of package are prevented from putting in electrical communication active surfaces 25', 26' of inductors 20', 21'.

As a result, inductors 20', 21' may be powered at high voltage and used for sealing at the same time the top end of two sleeves, without generating risks of short-circuits.

As a matter of fact, in such a case, inductors 20', 21' are fed with high voltage current and therefore the need of avoiding short-circuits between active surfaces 25, 26 is particularly felt.

Furthermore, both active surfaces 25, 26 of sealing device 15 are covered by plastic member 23 and are therefore, prevented from contacting the packaging material to be sealed.

Therefore, there is substantially no risk that inductors 20, 21 are corroded, even when they operate in an environment containing a sterilizing agent, like hydrogen peroxide.

Accordingly, inductors 20, 21 can efficiently exert a pressure onto the packaging material close to cross sealing, so that the melted plastic material of packaging material can mix and the final quality of the cross sealing is not impaired.

Clearly, changes may be made to sealing device 15, 15' as described and illustrated herein without, however, departing from the scope of the present invention as defined in the accompanying Claims.

In particular, member 23 could be made in a single piece and could, therefore, integrally define two portions which extend on opposite sides of plane M.

Finally, sealing device 15 could comprise, instead of insert 30, cup-shaped insert 30' with three projections 90', 91', 92'. In such a case, inductor 20 would be interposed between projections 90', 91' and inductor 21 would be interposed between projections 91', 92'.

Vice versa, sealing device 15' could comprise, instead of insert 30', a pair of inserts 30 each comprising a pair of elements 31. In such a case, inductors 20', 21' would be interposed between elements 31 of respective inserts 30.

The invention claimed is:

1. An induction sealing device for heat sealing packaging material, comprised of a base layer of paper or paperboard, a layer of metal foil, and a layer of heat-seal plastic, for producing sealed packages of pourable food products, the induction sealing device comprising:
    a first inductor which comprises, in turn, a first active surface adapted to be arranged on the side of said packaging material and to heat-seal said packaging material;
    a member made of injection molded plastic material that is injection molded onto the first active surface so that the injection molded plastic material is firmly connected to the first active surface;
    an insert made of magnetic flux-concentrating material, receiving at least in part the first inductor and covered by the member on the side arranged, in use, towards said packaging material; and
    said member covers said first active surface and is adapted to cooperate with said packaging material during the heat sealing of said packaging material.

2. The induction sealing device of claim 1, comprising a second inductor which comprises, in turn, a second active surface adapted to heat-seal said packaging material;
    said second active surface being covered by said member made of plastic material.

3. The induction sealing device of claim 2, wherein said member of plastic material is integral with said second inductor.

4. The induction sealing device of claim 3, wherein said member is a body of plastic material injection molded onto said second active surface and firmly connected thereto.

5. The induction sealing device of claim 4, wherein said member comprises:
   a first surface adapted to cooperate with said packaging material; and
   a second surface opposite to said first surface and cooperating with said first active surface; and wherein second surface cooperates with said second active surface.

6. The induction sealing device of claim 1, wherein said member of plastic material is integral with said first inductor.

7. The induction sealing device of claim 1, wherein said member comprises:
   a first surface adapted to cooperate with said packaging material; and
   a second surface opposite to said first surface and cooperating with said first active surface.

8. The induction sealing device of claim 1, wherein said member defines a pair of projections adapted to interact, in use, with said packaging material and protruding from said member on the opposite side of said inductor.

9. The induction sealing device of claim 1, comprising a second inductor which comprises, in turn, a second active surface adapted to heat-seal said packaging material;
   said second active surface protruding from said member on the side arranged, in use, towards said packaging material.

10. The induction sealing device of claim 1, comprising a hollow cylindrical element connected to the first inductor to create a cylindrical cooling cavity.

11. An induction sealing device for heat sealing packaging material comprised of a base layer of paper or paperboard, a layer of metal foil, and a layer of heat-seal plastic, the induction sealing device for producing sealed packages of pourable food products, the induction sealing device comprising:
   a first inductor which comprises a first active surface adapted to be arranged on the side of the packaging material and to heat-seal the packaging material;
   a member made of plastic material;
   an insert made of magnetic flux-concentrating material, receiving at least in part the first inductor and covered by the member on the side arranged, in use, towards the packaging material;
   the member covering the first active surface and adapted to cooperate with the packaging material during the heat sealing of the packaging material;
   a second inductor which comprises a second active surface adapted to heat-seal the packaging material;
   the second active surface protruding from the member on the side arranged, in use, towards said packaging material, so that the second active surface protruding from the member is exposed.

* * * * *